United States Patent
Suemasu et al.

(10) Patent No.: US 9,102,292 B2
(45) Date of Patent: Aug. 11, 2015

(54) STEERING APPARATUS

(71) Applicant: NSK Ltd., Tokyo (JP)

(72) Inventors: Yusuke Suemasu, Maebashi (JP); Masaya Jouta, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/411,574

(22) PCT Filed: Nov. 15, 2013

(86) PCT No.: PCT/JP2013/080898
§ 371 (c)(1),
(2) Date: Dec. 29, 2014

(87) PCT Pub. No.: WO2014/080844
PCT Pub. Date: May 30, 2014

(65) Prior Publication Data
US 2015/0158458 A1    Jun. 11, 2015

(30) Foreign Application Priority Data

Nov. 26, 2012  (JP) ................. 2012-257560
Feb. 4, 2013    (JP) ................. 2013-019528

(51) Int. Cl.
*B60Q 1/00*      (2006.01)
*B60R 25/023*   (2013.01)
*B60R 25/021*   (2013.01)

(52) U.S. Cl.
CPC ......... *B60R 25/023* (2013.01); *B60R 25/02105* (2013.01)

(58) Field of Classification Search
USPC ........ 280/775, 777, 779; 74/492, 493; 362/37
See application file for complete search history.

(56) References Cited

U.S. PATENT DOCUMENTS

| | | | |
|---|---|---|---|
| 3,917,021 A * | 11/1975 | Williams et al. | 180/271 |
| 3,940,580 A * | 2/1976 | Williams et al. | 200/61.85 |
| 5,992,191 A * | 11/1999 | Nickeas et al. | 70/218 |
| 2004/0261564 A1* | 12/2004 | Sato | 74/492 |
| 2010/0077808 A1 | 4/2010 | Maeda et al. | |
| 2013/0160592 A1* | 6/2013 | Shibazaki et al. | 74/492 |
| 2014/0246847 A1* | 9/2014 | Nagasawa et al. | 280/771 |
| 2014/0311273 A1* | 10/2014 | Nagasawa | 74/492 |
| 2015/0090520 A1* | 4/2015 | Shibazaki et al. | 180/446 |

FOREIGN PATENT DOCUMENTS

| | | |
|---|---|---|
| EP | 0 569 269 A1 | 11/1993 |
| EP | 1 607 290 A1 | 12/2005 |
| EP | 2 168 821 A1 | 3/2010 |

(Continued)

*Primary Examiner* — Toan To
(74) *Attorney, Agent, or Firm* — Miles & Stockbridge P.C.

(57) ABSTRACT

A steering apparatus (1) is provided, which includes: a key lock collar (5) being fitted on a steering shaft (2) and restricted from rotating by a steering lock mechanism when performing a steering lock; and a slip ring (8) being interposed between the steering shaft (2) and the key lock collar (5) in radial directions, wherein the slip ring (8) includes a plurality of protruded portions (9) protruding outwardly or inwardly in the radial directions and being provided in a circumferential direction, and an inner peripheral portion of the key lock collar (5) covering the slip ring (8) is formed with large-diameter portions (7*a*) and small-diameter portions (7*b*) in the axial direction, thereby further stabilizing slip torque of the key lock and enlarging a range of dimensional allowance.

10 Claims, 14 Drawing Sheets

(56) References Cited

FOREIGN PATENT DOCUMENTS

| JP | 60-50063 U | 4/1985 |
| JP | 07-291095 A | 11/1995 |
| JP | 2005-351457 A | 12/2005 |
| JP | 2010-105653 A | 5/2010 |
| JP | 2010-163115 A | 7/2010 |

* cited by examiner

STEERING APPARATUS

TECHNICAL FIELD

The present invention relates to a steering apparatus mounted on a vehicle etc.

BACKGROUND ART

There has hitherto existed a steering apparatus equipped with a steering lock mechanism that restricts a rotation of a steering wheel in order to prevent the vehicle etc from being stolen. The steering lock mechanism is configured to include a key lock collar fitted on a steering shaft and a steering lock device fitted to a column provided on an external side thereof, in which a lock bar provided on the steering lock apparatus is fitted into a grove or the like formed in the key lock collar, thereby disabling the steering wheel from being steered when the vehicle is to be stolen by restricting a rotation of the shaft.

In a conventional steering lock mechanism, it happened that if the steering wheel is rotated by strong force in a steering locked state, the steering lock mechanism was broken, and a lock function was damaged.

Such being the case, there exists a steering lock mechanism configured to rotate the key lock collar about the steering shaft when a predetermined or larger degree of force is applied so as to prevent a breakage, and to give a proper friction to such an extent as to disable the steering wheel from being steered, thereby preventing the vehicle from being stolen.

This type of steering lock mechanism is requested to be compatible with both of stabilizing a slip characteristic between an outer peripheral surface of the steering shaft and an inner peripheral surface of the key lock collar and setting a slip load to such a degree that the steering lock mechanism is not broken. Hence, there is a configuration for acquiring a predetermined magnitude of stable slip torque (frictional force) by forming a non-contact portion between the outer peripheral surface of the steering shaft and the inner peripheral surface of the key lock collar (refer to, e.g., Japanese Patent Application Laid-Open Publication No. 2010-163115).

Further, there is a configuration contrived not to cause an excessive frictional resistance by machining a grease groove in the steering shaft, retaining grease in this grease groove and supplying the grease to a frictional surface between the key lock collar and the steering shaft (refer to, e.g., Japanese Patent Application Laid-Open Publication No. H07-291095).

Moreover, there is a configuration for the purpose of protecting the steering lock mechanism, in which a slip ring is attached to a fitting portion between the key lock collar and the steering shaft (refer to, e.g., Japanese Patent Application Laid-Open Publication No. 2005-351457).

SUMMARY OF THE INVENTION

Problems to be Solved by the Invention

As described above, in the case of the configuration of forming the non-contact portion between the steering shaft and the key lock collar and the configuration using the grease, though a management load on dimensional accuracy is reduced, the key lock collar needs to be press-fitted in the steering shaft, and hence this portion is to be managed strictly to some extent in terms of dimensional accuracy, resulting in a problem that a machining cost rises corresponding to this strict management.

Moreover, in the case of attaching the slip ring to the fitting portion between the steering shaft and the key lock collar, the slip torque (the torque at which the slip ring starts slipping) of the slip ring is determined by the spring force of the slip ring and a fastening margin based on a gap between the shaft and the collar, however, the slip ring has a high spring constant because of its being a plate spring and is sensitive to a change in fastening margin. Accordingly, the dimensional accuracy of the portion attached with the slip ring is to be strictly managed, and further, if sensitive to the change in fastening margin, there increases an influence caused by a residual stress of the slip ring, resulting in such a problem that the machining cost rises due to process that setting and annealing are to be applied to the slip ring and so on.

It is an object of the present invention, which was devised by putting a focus on the problems described above, to provide a steering apparatus configured to further stabilize slip torque of a key lock collar and enlarge a range of dimensional allowance.

Means for Solving the Problems

In order to solve the problems described above, the present invention provides a steering apparatus including: a key lock collar being fitted on a steering shaft and restricted from rotating by a steering lock mechanism when performing a steering lock; and a cylindrical slip ring being interposed between the steering shaft and the key lock collar in radial directions, wherein the key lock collar has a shape that reduces a change in load against displacement (a quantity of deformation in radial directions) of the slip ring.

To be specific, the key lock collar is contrived to abut on the slip ring at a plurality of portions in an axial direction. Further, the key lock collar is contrived to form a clearance for allowing the displacement of the slip ring.

The term "steering lock mechanism" connotes a mechanism that restricts the steering shaft from rotating as the necessity arises in order to prevent a vehicle from being stolen. The term "key lock collar" connotes a member that restricts the steering shaft from rotating by its being fitted on the steering shaft and getting engaged with the steering lock mechanism. The term "slip ring" connotes a member that takes a substantially cylindrical shape and absorbs a dimensional error by a spring effect. Specifically, the "slip ring" connotes the member that takes the substantially cylindrical shape and stabilizes the slip torque in relative rotations of internal and external members by absorbing a dimensional error in the radial directions between the member (the internal member) disposed in a way that abuts on an inside diametrical side and the member (the external member) disposed in a way that abuts on an outside diametrical side by deformation in the radial directions. In the present application, the key lock collar corresponds to the external member, while the steering shaft corresponds to the internal member.

Further, in order to solve the problems described above, the present invention provides a steering apparatus including: a key lock collar being fitted on a steering shaft and restricted from rotating by a steering lock mechanism when performing a steering lock; and a slip ring being interposed between the steering shaft and the key lock collar in radial directions, wherein the slip ring includes a plurality of protruded portions protruding outwardly or inwardly in the radial directions and being provided in a circumferential direction, and an inner peripheral portion of the key lock collar covering the slip ring is formed with large-diameter portions and small-diameter portions in the axial direction, thereby providing a space for the slip ring to get flexed.

The configuration being thus made forms a clearance given for the slip ring to get deformed, facilitates the deformation of the slip ring and enables a change in load against the displacement of the slip ring to be decreased.

Preferably, the steering shaft is formed with stepped portions to restrict the slip ring from moving in the axial direction in a face-to-face relationship with axis-directional end portions of the slip ring.

The configuration being thus made prevents a positional deviation of the ring portion of the slip ring and enables a slip characteristic to be stabilized.

Preferably, the slip ring includes ring portions not being formed with the protruded portions on the same circumference, and the small-diameter portion abuts on only any one of the protruded portion and the ring portion.

With this contrivance, the deformation of the slip ring is further facilitated, and a much higher effect can be obtained. It is preferable that the ring portions are provided at end portions of at least front and rear sides of the vehicle.

Preferably, the protruded portion extends in the axial direction and takes a circular arc shape in section cut vertically in the axial direction.

With this contrivance, it is feasible to acquire smooth and stable rotations without being caught. Note that the term "axial direction" connotes a direction of an axis line about which the steering shaft rotates.

Preferably, the axis-directional portion of the key lock collar covering the slip ring is formed with two or more small-diameter portions.

This contrivance provides a better stability of the slip ring and enables the stable rotations to be acquired. The three or more small-diameter portions are formed in the axial direction of the key lock collar, in which case the stable rotations can be acquired by disposing the small-diameter portions at equal intervals.

Preferably, the small-diameter portion is provided in a position that faces a substantially lengthwise center of the slip ring in the axial direction.

With this contrivance, in addition to the stabilization of the slip ring characteristic, the small-diameter portions can exhibit a reinforcing effect against the load applied to the key lock collar when the steering shaft is twisted in a steering locked state.

Preferably, the large-diameter portion and the small-diameter portion are formed continuously by a smooth curved surface in the axial direction.

With this contrivance, workability on the occasion of assembling is improved, the smooth rotation can be made without being caught, and the respective members can be prevented from deviating in the axial direction.

It is preferable that each of the small-diameter portions has the same dimension of the inside diameter within a fixed range throughout in the axial direction, and each of the large-diameter portions has a maximum diameter at the center in the axial direction. A stable contact of the small-diameter portion can be acquired, and the clearance allowing the displacement of the slip ring can be efficiently formed.

Preferably, the protruded portions protruding outwardly in the radial directions are disposed in two areas in the axial direction with the ring portions being interposed therebetween, which are not formed with the protruded portions on the same circumference, and the two small-diameter portions are formed in the axial direction.

With this contrivance, the slip torque can be increased as compared with a case of not disposing the protruded portions in the two areas. The protruded portions disposed in the two areas in the axial direction are equalized in length in the axial direction, whereby the stable rotation can be obtained.

Preferably, the key lock collar includes a holed portion into which the steering lock mechanism inserts a rotation restricting bar, and the holed portion is formed in a portion not facing the slip ring in radial directions.

A position of the portion formed with the elongate hole and a position of the portion in which the slip ring is fitted are differentiated from each other in the axial direction, thereby preventing roundness from decreasing due to deformation of the portion in which to fit the slip ring in the process of forming the elongate hole and attaining the stable slip torque.

It may be sufficient that the portion engaging with the lock bar gets engaged with the lock bar so that the key lock collar does not rotate, and hence this portion can be configured as an engagement portion other than the holed portion. For example, in place of the holed portion described above, an available configuration is that an outer peripheral portion of the key lock collar is formed with a bottomed groove portion extending in the axial direction, and a plurality of these groove portions may also be formed in a circumferential direction. However, the formation of the engagement portion is facilitated by adopting the holed portion.

The holed portion described above is configured as the elongate hole extending in the axial direction and can be thereby flexible to a change in position in the axial direction. The portion, not facing the slip ring, of the key lock collar is loosely fitted to the steering shaft, whereby the management of the dimensional accuracy can be reduced.

Preferably, the protruded portions protrude outwardly in the radial directions, and the small-diameter portions and the protruded portions are disposed in face-to-face positions in the radial directions.

With this contrivance, the clearance given for the slip ring to get deformed is efficiently formed, and the deformation of the slip ring is further facilitated.

Grease may be applied to the contact portion between the key lock collar and the slip ring and to the contact portion between the slip ring and the steering shaft. This contrivance enables the slip torque to be further stabilized.

Effect of the Invention

According to the present invention, it is possible to provide the steering apparatus configured to further stabilize the slip torque of the key lock collar and to enlarge the range of the dimensional allowance.

BRIEF DESCRIPTION OF THE DRAWINGS

FIG. 3A is a plan view; FIG. 3B is a sectional view illustrating a section cut off along the line 3B-3B in FIG. 3A; and FIG. 3C is an enlarged view of a corrugated portion.

FIG. 4A is a plan view; and FIG. 4B is a sectional view illustrating a section cut off along the line 4B-4B in FIG. 4A.

FIG. 5A shows a side surface of the steering shaft and sections of the key lock collar and the slip ring; and FIG. 5B is an enlarged view of portions in the periphery of the slip ring in FIG. 5A.

FIG. 6A is a plan view; and FIG. 6B is a sectional view taken along the line 6B-6B in FIG. 6A.

FIG. 7A illustrates a side surface; FIG. 7B illustrates an end surface; FIG. 7C illustrates a section taken along the line 7C-7C in FIG. 7A; and FIG. 7D illustrates a section taken along the line 7D-7D in FIG. 7B.

FIG. 10A is a side view; and FIG. 10B is a sectional view taken along the line 10B-10B in FIG. 10A.

FIG. 11A illustrates a side surface; FIG. 11B illustrates an end surface; FIG. 11C illustrates a section taken along the line 11C-11C in FIG. 11A; and FIG. 11D illustrates a section taken along the line 11D-11D in FIG. 11B.

FIG. 14A is a side view; and FIG. 14B is a sectional view taken along the line 14B-14B in FIG. 14A.

MODE FOR CARRYING OUT THE INVENTION

First Embodiment

Figure 1:
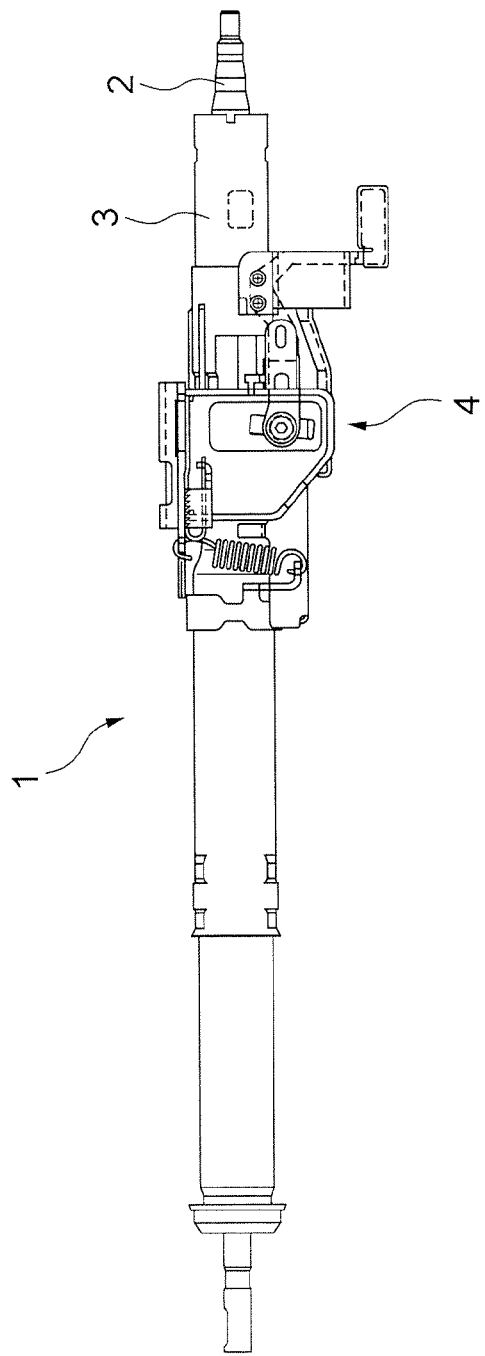
FIG. 1 is a side view illustrating a steering apparatus according to a first embodiment of the present application.

A first embodiment of the present invention will be described with reference to FIG. 1 to FIG. 5B. FIG. 1 is a side view illustrating a steering apparatus according to the first embodiment of the present application.

A steering apparatus 1 is configured to include mainly a steering shaft 2 to transfer the rotation of the steering wheel (unillustrated) fitted to a rear side (a right side as viewed in FIG. 1) of the vehicle to a front side (a left side as viewed in FIG. 1) of the vehicle, a column 3 which rotatably supports the steering shaft 2, and a position adjusting mechanism 4 which fixes a rear-side portion of the steering apparatus 1 to a vehicle body and thus enables a tilt position and a telescopic position to be adjusted.

Figure 2:
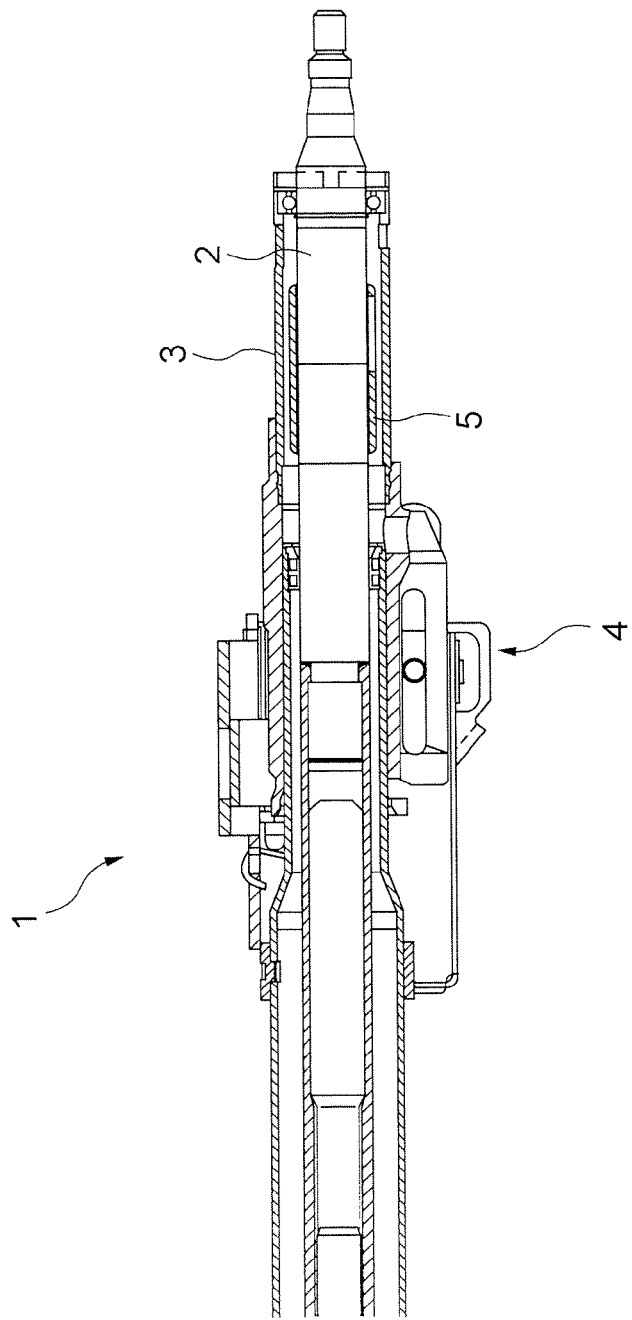
FIG. 2 is an enlarged sectional view of the steering apparatus according to the first embodiment of the present application.

FIG. 2 is an enlarged sectional view of portions in the vicinity of the position adjusting mechanism 4 of the steering apparatus 1 according to the first embodiment of the present application.

A key lock collar 5 building up the steering lock mechanism is fixedly fitted onto a portion of the steering shaft 2 on the more rear side of the vehicle than the position adjusting mechanism 4.

Figure 3A:
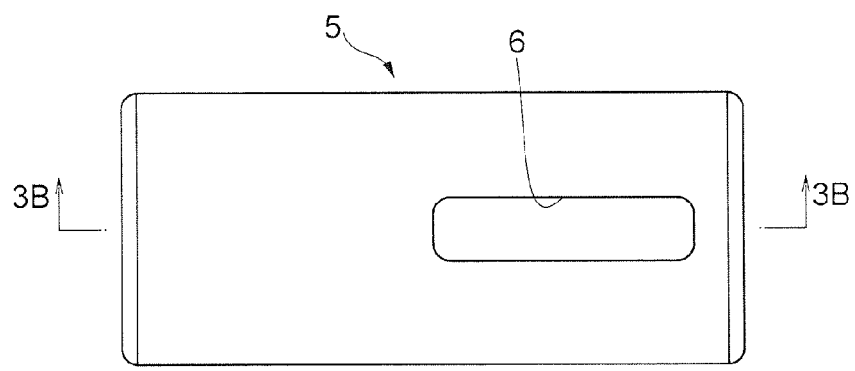
FIGS. 3A, 3B and 3C are views each depicting a key lock collar according to the first embodiment of the present application.
Figure 3B:
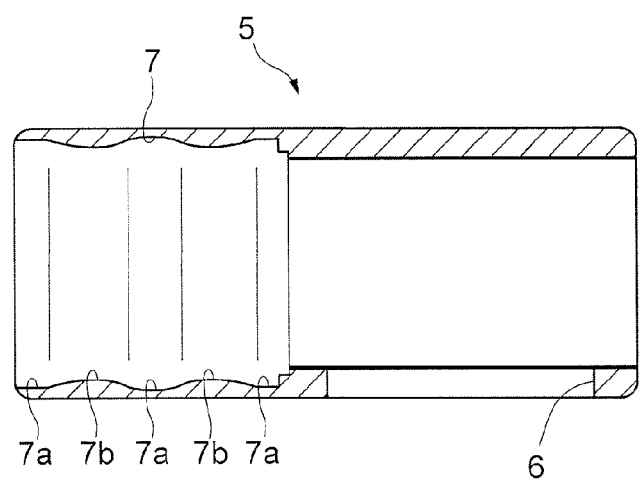
Figure 3C:
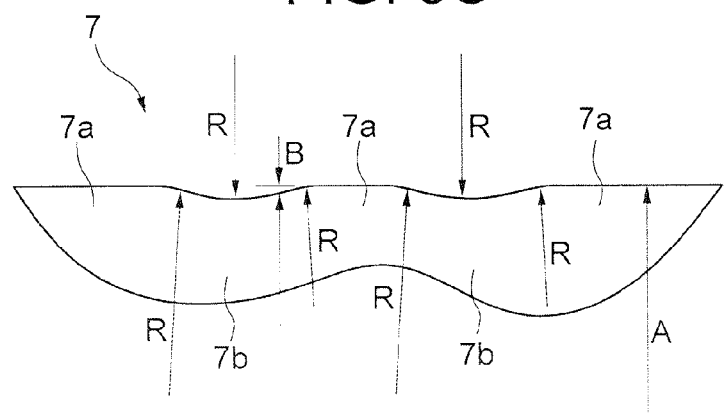

FIGS. 3A, 3B and 3C are views each depicting the key lock collar 5 according to the first embodiment of the present application. FIG. 3A is a plan view of the key lock collar 5, FIG. 3B is a sectional view showing a cutting plane taken along the line 3B-3B in FIG. 3A, and FIG. 3C is an enlarged view of a corrugated portion.

The key lock collar 5 taking a cylindrical shape is formed with an elongate hole 6 extending toward the rear side of the vehicle in an axial direction from the vicinity of a central portion in the axial direction thereof. The elongate hole 6 is a portion receiving insertion of a lock bar protruding from an unillustrated steering lock device fitted to the column 3 and thus being engaged with the lock bar on the occasion of locking the rotation of the steering wheel. The key lock collar 5 can be formed from a material such as carbon steel for a mechanical structure.

A corrugated portion 7 formed with a diameter-enlarged portion and a diameter-reduced portion repetitively corresponding to positions in the axial direction, is configured on an inner diametrical side of the portion, existing on the front side of the vehicle, of the key lock collar 5. The corrugated portion 7 includes the diameter-enlarged portion and the diameter-reduced portion, which are formed repetitively along a smoothly-curved outer diametrical surface in a way that corresponds to the positions in the axial direction, and even the diameter-reduced portion having a minimum diameter is larger than a diameter of each of other inner peripheral surfaces of the key lock collar 5 adjacent to the corrugated portion 7. The corrugated portion 7 is formed with large-diameter portions 7a in three positions and small-diameter portions 7b in two positions.

The corrugated portion 7 includes, as illustrated in FIG. 3C, the large-diameter portions 7a having a maximum radius A that are formed in two right-and-left positions and in a middle position therebetween, in which these portions 7a have the same diameter over a fixed length in the axial direction. The small-diameter portions 7b each having the diameter smaller than the diameter of the large-diameter portion 7a are disposed in two positions between the large-diameter portions 7a, 7a and between the large-diameter portions 7a, 7a. The diameter of the small-diameter portion 7b is reduced by a dimension B, corresponding to the position in the axial direction, from the maximum radius A of the large-diameter portion 7a, and the dimension B is maximized in the middle position. The large-diameter portions 7a and the small-diameter portions 7b are smoothly continuous along the curved surface in the axial direction. The corrugated portion 7 can be configured by a cutting work.

A slip ring 8, which will be described later on, is disposed on an inner diametrical side of the corrugated portion 7. A position of the portion formed with the elongate hole 6 is differentiated in the axial direction from a position of the portion in which the slip ring 8 is fitted, thereby preventing roundness from decreasing due to deformation of the portion in which to fit the slip ring 8 in the process of forming the elongate hole 6 and enabling stable slip torque to be acquired.

Note that it is preferable in the present invention to dispose the elongate hole on a more rear side of the vehicle than the slip ring, however, the elongate hole may be disposed on the front side of the vehicle, while the slip ring may also be disposed on the rear side of the vehicle.

Figure 4A:
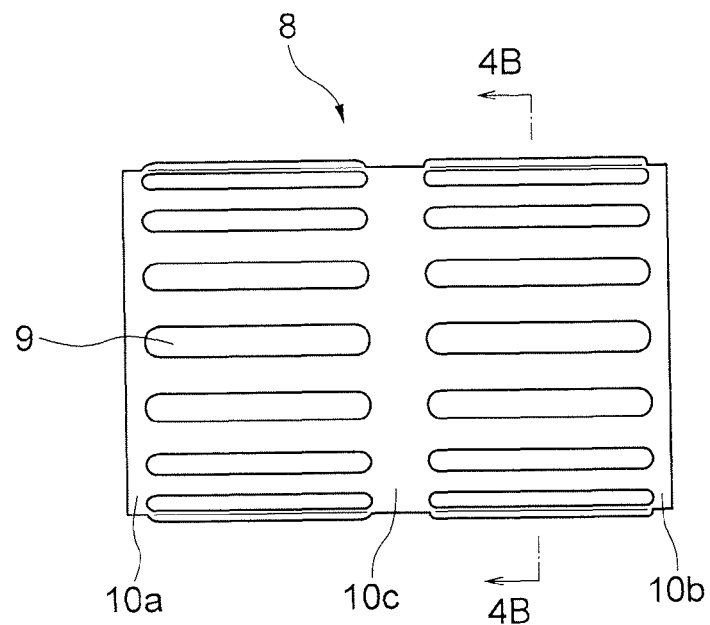
FIGS. 4A and 4B are views each depicting a slip ring according to the first embodiment of the present application.
Figure 4B:
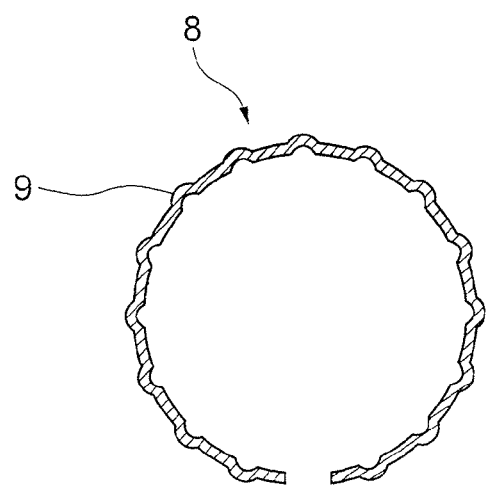

FIGS. 4A and 4B are views each depicting the slip ring 8 according to the first embodiment of the present application. FIG. 4A is a plan view, and FIG. 4B is a sectional view showing a cutting plane taken along the line 4B-4B in FIG. 4A.

As described above, the slip ring 8 is disposed on the inner diametrical side of the key lock collar 5 and is interposed between the steering shaft 2 and the key lock collar 5. The slip ring 8 taking a substantially C-shape in section includes protruded portions 9 protruding outwardly in radial directions and extending in the axial direction, in which pluralities of protruded portions 9 are disposed in two areas on the front and rear sides of the vehicle. The protruded portions 9 are disposed in the two areas in the axial direction, whereby slip torque can be increased. The slip ring 8 can involve using slip rings being composed of spring steel etc and available on the market. A manufacturing cost can be prevented from rising by using those being available on the market.

The slip ring 8 includes ring portions 10*a*, 10*b*, 10*c* not having the protruded portions 9 on the same circumference at edge portions on the front and rear sides of the vehicle and middle portions therebetween.

The protruded portion 9 takes, as illustrated in FIG. 4B, a circular arc shape in section being cut along a direction perpendicular to the axial direction. This configuration prevents the slip ring 8 from being caught by a contact surface of the key lock collar 5 and enables smooth and stable rotations to be obtained.

Figure 5A:
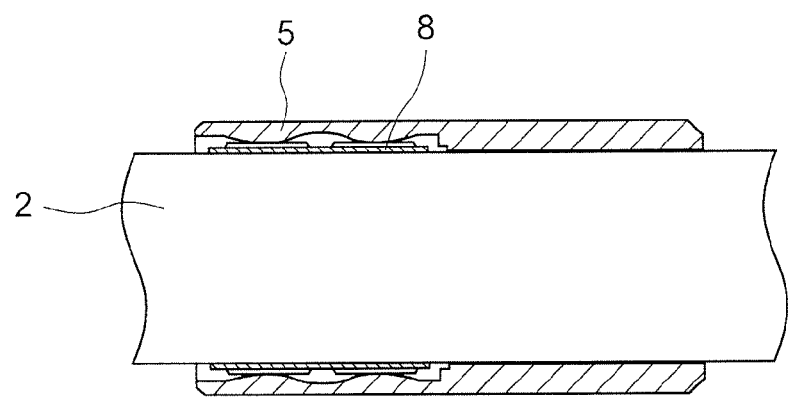
FIGS. 5A and 5B are views of a steering shaft, a key lock collar and a slip ring of the steering apparatus according to the first embodiment of the present application.
Figure 5B:
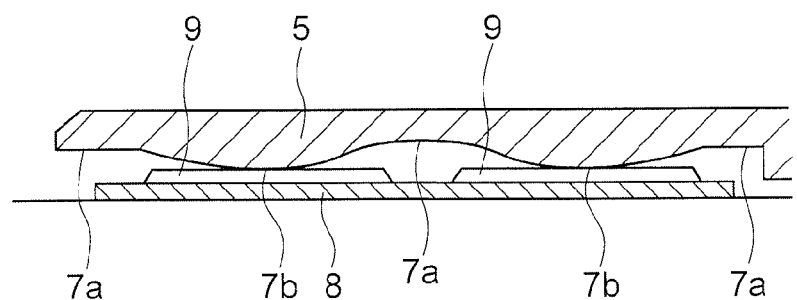

FIGS. 5A and 5B are views depicting the steering shaft 2 and the key lock collar 5 of the steering apparatus 1 according to the first embodiment of the present application. FIG. 5A shows a side surface of the steering shaft 2 and a section of the key lock collar 5. FIG. 5B is an enlarged view of the portions in the periphery of the slip ring 8 in FIG. 5A.

The fitting portion on the front side of the vehicle is formed with the corrugated portion 7 on the inner peripheral surface of the key lock collar 5 as described above, whereby the key lock collar 5 and the slip ring 8 are brought into contact with each other in two positions in the axial direction. The fitting portion between the key lock collar 5 and the slip ring 8 on the rear side of the vehicle is attained by lose fitting.

The slip ring 8 is a plate spring formed from a plate material and therefore has a comparatively high spring constant and a large variation in load against displacement (a quantity of deformation in the radial directions). The configuration that the key lock collar 5 and the slip ring 8 are brought into contact with each other in two positions, can provide a space for the slip ring 8 to get flexed and can therefore moderate a flexible characteristic of the slip ring 8. As a result, the appropriate slip characteristic is obtained even by enlarging a tolerance of an outside diameter of the steering shaft 2 and a tolerance of an inside diameter of the key lock collar 5.

Further, as in the first embodiment, the axis-directional portion of the key lock collar 5 abutting on the slip ring 8 is corrugated, thereby enabling the key lock collar 5 to be incorporated from the axial direction without being caught after the slip ring 8 has been assembled to the steering shaft 2 and improving workability. Moreover, the steering shaft 2 is enabled to smoothly rotate without being caught by taking the corrugated configuration.

As depicted in FIG. 5B, the protruded portion 9 of the slip ring 8 and the small-diameter portion 7*b* of the corrugated portions 7 are provided in face-to-face positions in the radial directions. This contrivance gives a well-balanced reacting force of the slip ring 8 and enables the slip ring 8 to stably rotate without any motion in the axial direction when slipped.

Second Embodiment

Next, the steering apparatus according to a second embodiment of the present application will be described with reference to FIGS. 6A and 6B. The steering apparatus according to the second embodiment is different from the steering apparatus 1 according to the first embodiment in terms of only the shape of the slip ring, and other configurations are the same as those in the first embodiment. Accordingly, the description of the second embodiment will discuss only the shape of the slip ring, while the explanations of other configurations will be omitted.

Figure 6A:
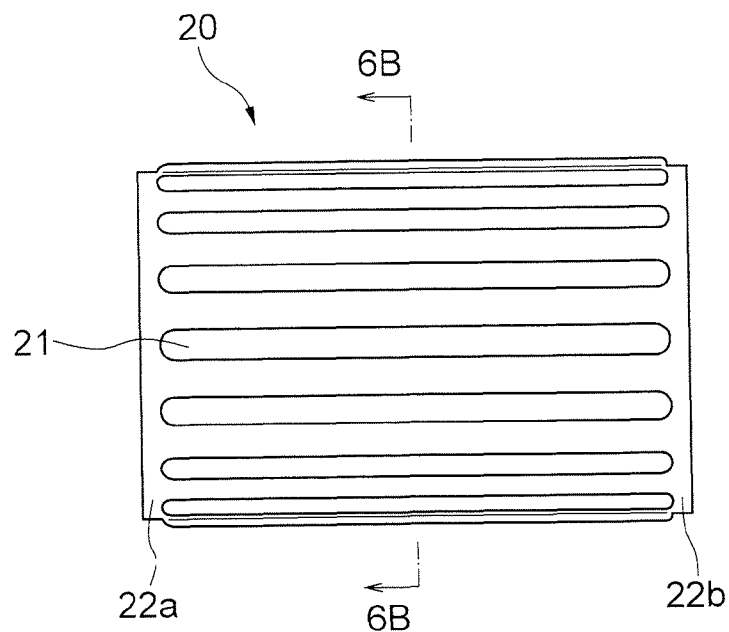
FIGS. 6A and 6B are views each depicting the slip ring used for the steering apparatus according to a second embodiment of the present application.
Figure 6B:
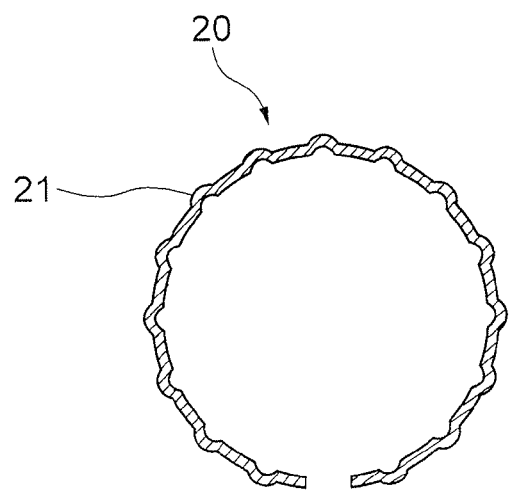

FIGS. 6A and 6B are views each illustrating a slip ring 20 of the steering apparatus according to the second embodiment of the present application. FIG. 6A is a plan view, and FIG. 6B is a sectional view taken along the line 6B-6B in FIG. 6A.

The slip ring 20 taking a substantially C-shape in section includes protruded portions 21 protruding outwardly in the radial directions and extending in the axial direction from the vicinity of one end of the slip ring 20 in the axial direction up to the vicinity of the other end thereof, in which the plurality of protruded portions 9 is disposed in a circumferential direction.

The slip ring 20 includes ring portions 22*a*, 22*b* provided at the edge portions on the front and rear sides of the vehicle but not having the protruded portions 21 on the same circumference.

According to the second embodiment, the slip torque becomes smaller than that in the first embodiment described above, and the dimensional tolerances of the steering shaft and the key lock collar become larger than those in the first embodiment. The slip torque of the key lock collar is therefore further stabilized.

Third Embodiment

A third embodiment of the present application will be described with reference to FIGS. 7A to 10B. The steering apparatus according to the third embodiment is different from the steering apparatus according to the second embodiment in terms of only a shape of a key lock collar 35, and other configurations are the same as those in the second embodiment. Hence, the description of the third embodiment will discuss only the shape of the key lock collar 35, while the explanations of other configurations will be omitted.

Figure 7A:
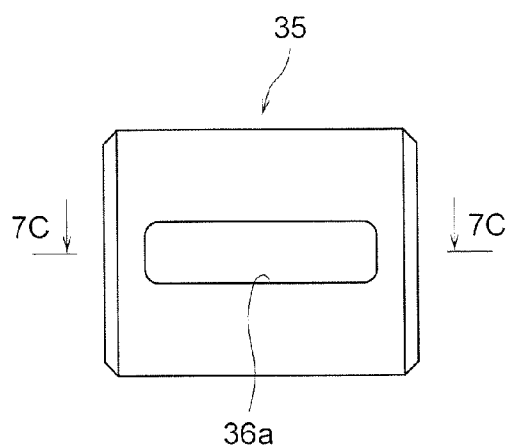
FIGS. 7A, 7B, 7C and 7D are views each illustrating the key lock collar of the steering apparatus according to a third embodiment of the present application.
Figure 7B:
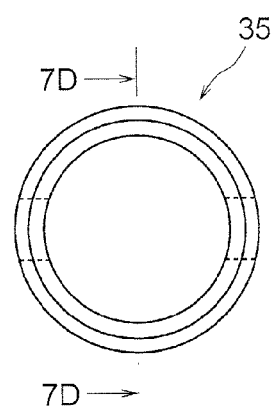
Figure 7C:
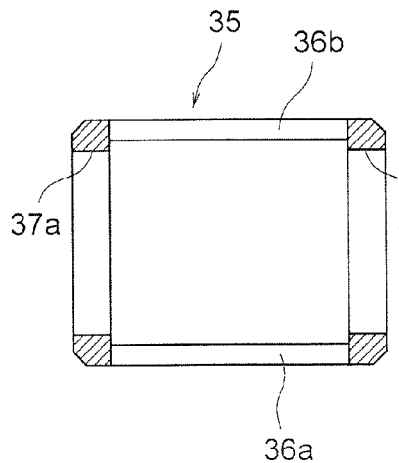
Figure 7D:
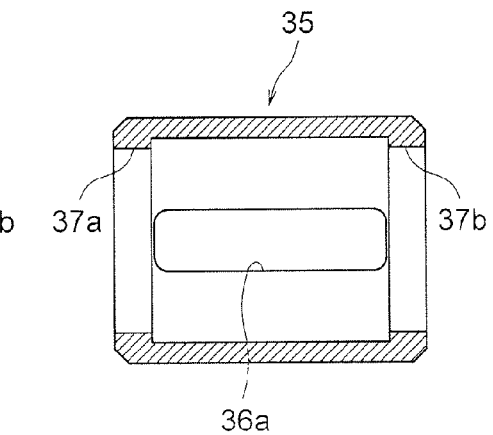

FIGS. 7A, 7B, 7C, 7D are views each illustrating the key lock collar 35 according to the third embodiment of the present application. FIG. 7A shows a side surface, FIG. 7B shows an end surface, FIG. 7C shows a section taken along the line 7C-7C in FIG. 7A, and FIG. 7D shows a section taken along the line 7D-7D in FIG. 7B. The key lock collar 35 is different from the key lock collar 5 described above in terms of such a point that portions formed with elongate holes 36*a*, 36*b* and a portion in which to fit the slip ring are formed (aligned) in the same position in the axial direction. Further, such a point is different from the key lock collar 5 described above that the key lock collar 35 is formed with two elongate holes 36*a*, 36*b* in face-to-face positions in the radial directions. The configuration of the key lock collar 35 according to the third embodiment contributes to a reduction in weight of the steering apparatus.

The key lock collar 35 takes a cylindrical shape on the whole as depicted in FIGS. 7A, 7B and is formed with the elongate holes 36*a*, 36*b* extending in the axial direction in the face-to-face positions in the radial directions as illustrated in FIG. 7B. Moreover, annular diameter-reduced portions 37a, 37b with their diameters being reduced to a greater degree than other inside-diameter portions, are formed on the inside diametrical sides of both end portions (the end portions on the front and rear sides of the vehicle) of the key lock collar 35 in the axial direction. Because of the key lock collar 35 taking a bilateral symmetry as viewed in FIGS. 7A, 7B, 7D, the steering shaft can be inserted from either left or right side, and it does not matter which directions the front and rear sides of the vehicle set their faces toward, which leads to the high workability given when assembled.

Figure 8:
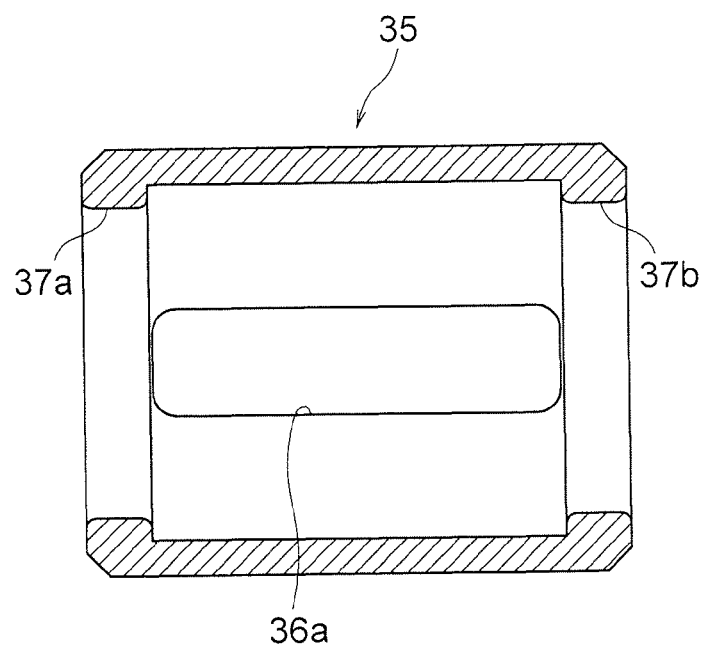
FIG. 8 is an enlarged view of FIG. 7D, illustrating a section of the key lock collar of the steering apparatus according to the third embodiment of the present application.

FIG. 8 is an enlarged view of FIG. 7D. The elongate holes 36a, 36b extend in the axial direction over a gap between mutually face-to-face surfaces of the diameter-reduced portions 37a, 37b. Inside-diametrical portions of the diameter-reduced portions 37a, 37b are formed with surfaces parallel to the axial direction but are rounded at both edge portions in the axial direction. With this contrivance, the steering shaft can be, on the occasion of being inserted into the key lock collar 35, smoothly inserted without being caught. Further, a load can be stabilized by preventing the steering shaft from being caught etc also when making a slip rotation. Note that the same effect can be acquired also by chamfering both axis-directional end portions of the inside-diametrical portions of the diameter-reduced portions 37a, 37b and further also by rounding the whole inside-diametrical portions. It is preferable that the diameter-reduced portions 37a, 37b have the diameters reduced by 0.4 mm to 2.0 mm further than other inside-diametrical portions.

Figure 9:
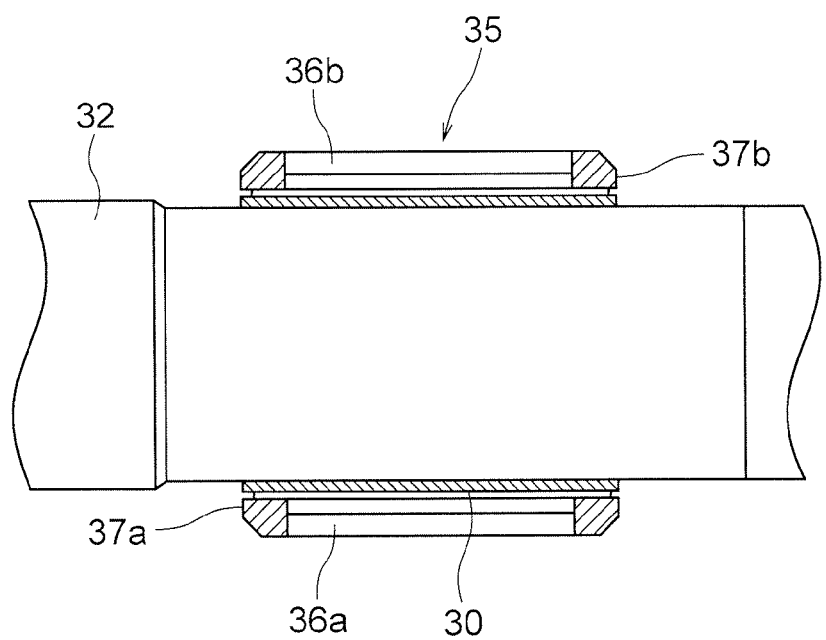
FIG. 9 is a view illustrating a side surface of the steering shaft and sections of the key lock collar and the slip ring of the steering apparatus according to the third embodiment of the present application.

FIG. 9 is a view illustrating sections of a steering shaft 32, a slip ring 30 fitted on the steering shaft 32 and the key lock collar 35 of the steering apparatus according to the third embodiment of the present application. The key lock collar 35 abuts on the slip ring 30 at the diameter-reduced portions 37a, 37b. Thus, the diameter-reduced portions 37a, 37b abut on the slip ring 30 in the vicinities of the edge portions, and a clearance for the slip ring 30 is provided between the diameter-reduced portions 37a and 37b, in which the slip ring thereby becomes easy to get flexed with the result that the spring characteristic decreases, and a change in load against the displacement can be thereby lessened. Moreover, according to the key lock collar 35, a space is produced in the radial directions between the slip ring 30 and the key lock collar 35 within a range between the diameter-reduced portions 37a and 37b, thereby enabling engagement of a key lock bar to be stabilized with an increased engagement margin of the key lock bar. Note that the slip ring 30 can involve using the slip ring 8 in the first embodiment and other slip rings corresponding to the slip torques.

Figure 10A:
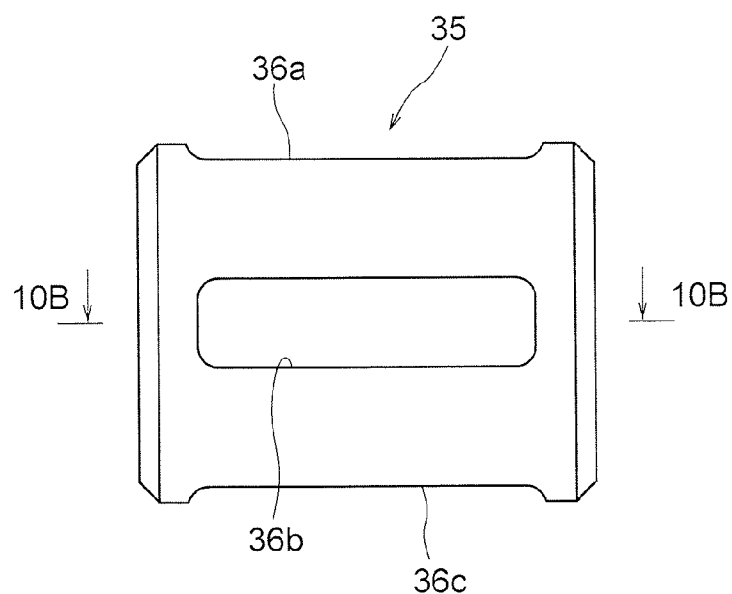
FIGS. 10A and 10B are views each illustrating a modified example of the key lock collar of the steering apparatus according to the third embodiment of the present application.
Figure 10B:
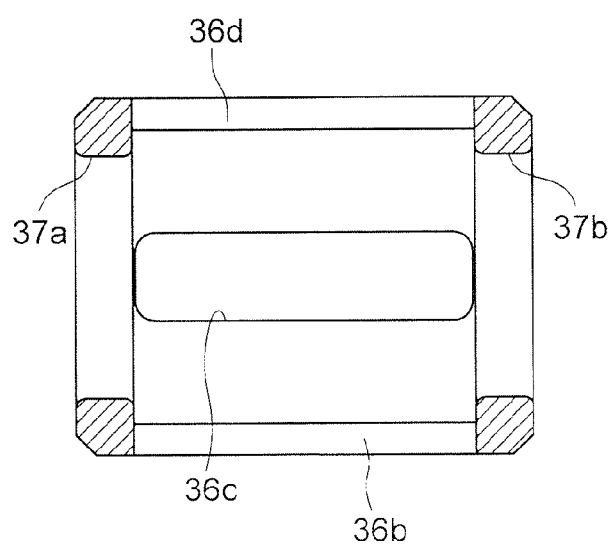

FIGS. 10A and 10B are views each depicting a modified example of the key lock collar of the steering apparatus according to the third embodiment of the present application. FIG. 10A is a side view, and FIG. 10B is a sectional view taken along the line 10B-10B in FIG. 10A. In the present modified example, four elongate holes 36a, 36b, 36c, 36d are provided at equal intervals in the circumferential direction. With this contrivance, the key lock bar engages with the key lock collar 35 at a far smaller steering angle. Thus, according to the present invention including other embodiments, the number of elongate holes can be changed such as setting the number of elongate holes to "1" and "3" or more.

Fourth Embodiment

A fourth embodiment of the present application will be described with reference to FIGS. 11A to 14B. The steering apparatus according to the fourth embodiment of the present application is different from the steering apparatus according to the third embodiment in terms of only a shape of a key lock collar 45, and other configurations are the same as those in the third embodiment. Hence, the description of the fourth embodiment will discuss only the shape of the key lock collar 45, while the explanations of other configurations will be omitted.

Figure 11A:
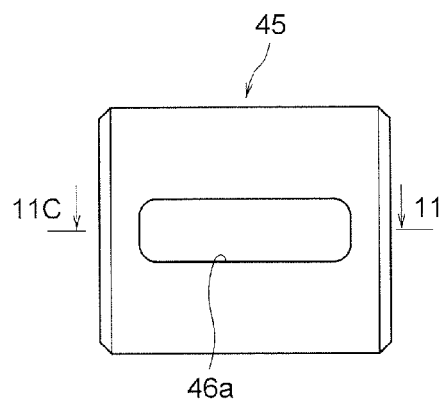
FIGS. 11A, 11B, 11C and 11D are views each illustrating the key lock collar of the steering apparatus according to a fourth embodiment of the present application.
Figure 11B:
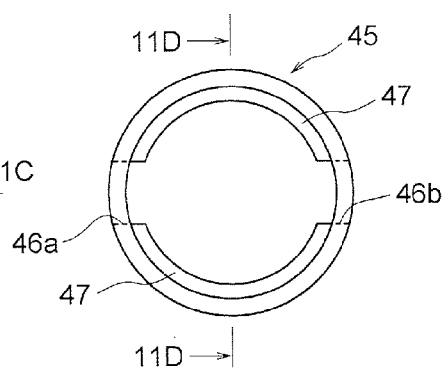
Figure 11C:
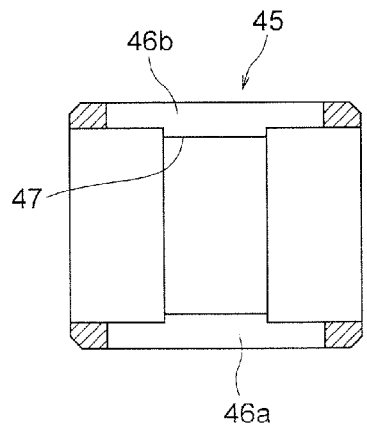
Figure 11D:
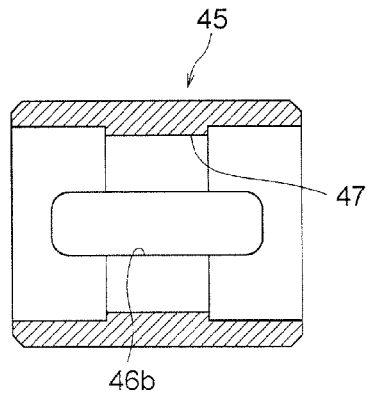

FIGS. 11A, 11B, 11C, 11D are views each illustrating the key lock collar 45 according to the fourth embodiment of the present application. FIG. 11A illustrates a side surface, FIG. 11B illustrates an end surface, FIG. 11C illustrates a section taken along the line 11C-11C in FIG. 11A, and FIG. 11D illustrates a section taken along the line 11D-11D in FIG. 11B. The key lock collar 45 is different from the key lock collar 35 in the third embodiment in terms of such a point that the diameter-reduced portions 47 formed at the inside-diametrical portion are provided in one area at the center of the key lock collar 45 in the axial direction. Further, the diameter-reduced portions 35 are not continuous in the annular shape but are segmented into two parts by the elongate holes 46a, 46b as depicted in FIG. 11B, which point is different from the key lock collar 35 in the third embodiment.

Figure 12:
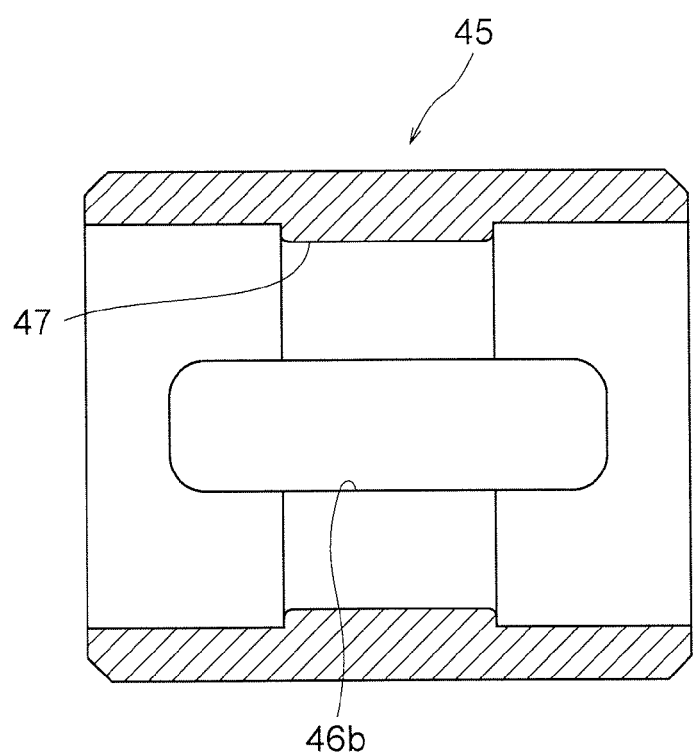
FIG. 12 is an enlarged view of FIG. 11D, illustrating a section of the key lock collar of the steering apparatus according to the fourth embodiment of the present application.

FIG. 12 is an enlarged view of FIG. 11D. The inside-diametrical portion of the diameter-reduced portion 47 is formed with surfaces parallel to the axial direction but is rounded at both edge portions (the edge portions on the front and rear sides of the vehicle) in the axial direction. With this contrivance, the steering shaft can be, on the occasion of being inserted into the key lock collar 45, smoothly inserted without being caught. Further, the load can be stabilized by preventing the steering shaft from being caught etc also when making the slip rotation. Note that the same effect can be acquired also by chamfering both axis-directional end portions of the inside-diametrical portions of the diameter-reduced portion 47 and further also by rounding the whole inside-diametrical portions. The edge portions of the diameter-reduced portion 47 can be also rounded, chamfered or formed as inclined faces, etc.

Figure 13:
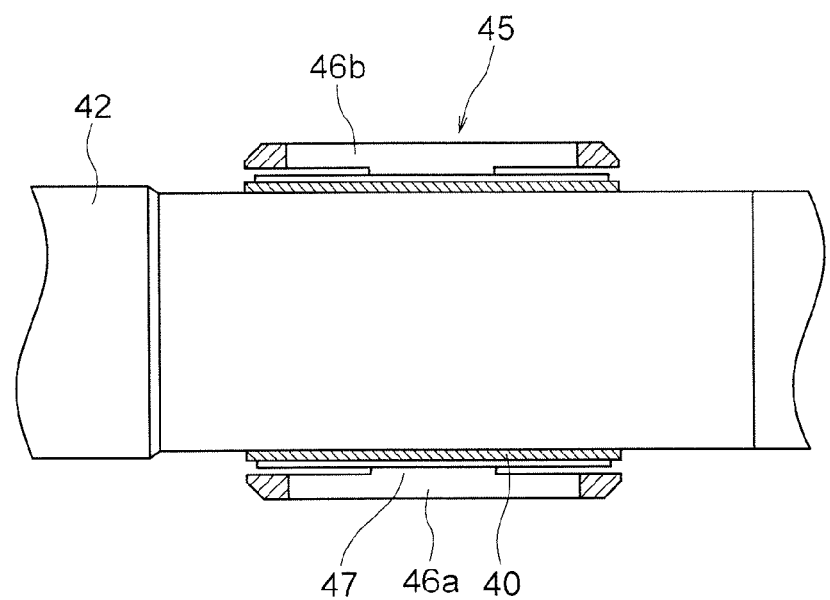
FIG. 13 is a view illustrating a side surface of the steering shaft and sections of the key lock collar and the slip ring of the steering apparatus according to the fourth embodiment of the present application.

FIG. 13 is a view illustrating sections of a steering shaft 42, a slip ring 40 fitted on the steering shaft and the key lock collar 45 of the steering apparatus according to the fourth embodiment of the present application. The key lock collar 45 abuts on the slip ring 40 at the diameter-reduced portion 47. Thus, the diameter-reduced portion 47 abuts on the slip ring 40 only at the vicinity of the central portion of the slip ring 40, thereby facilitating deformation of the slip ring 40 with the result that the spring characteristic decreases and consequently enabling the change in load against the displacement to be reduced. Further, according to the key lock collar 45, the diameter-reduced portion 47 serves as reinforcement against the load applied from the key lock bar. Moreover, the key lock collar 45 can accept the insertion of the steering shaft from either side in the axial direction, and it does not matter which directions the front and rear sides of the vehicle set their faces toward, which leads to the high workability given when assembled. Additionally, because of the diameter-reduced portion 47 abutting on the slip ring 47 in the vicinity of substantially the center of the slip ring 40 in the axial direction, the spring force is approximately equalized on both sides in the axial direction, the key lock collar 45 therefore becomes hard to deviate in the axial direction when rotating and smoothly rotates, thereby stabilizing the slip torque.

Figure 14A:
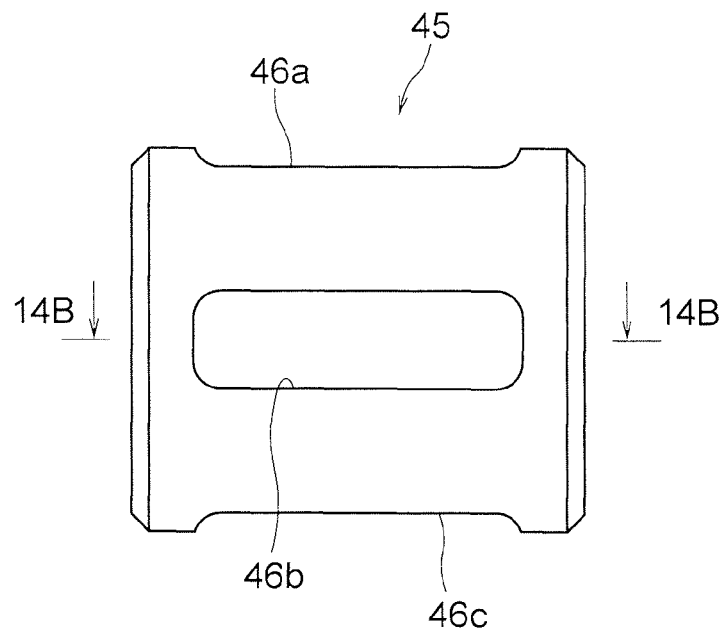
FIGS. 14A and 14B are views each illustrating a modified example of the key lock collar of the steering apparatus according to the fourth embodiment of the present application.
Figure 14B:
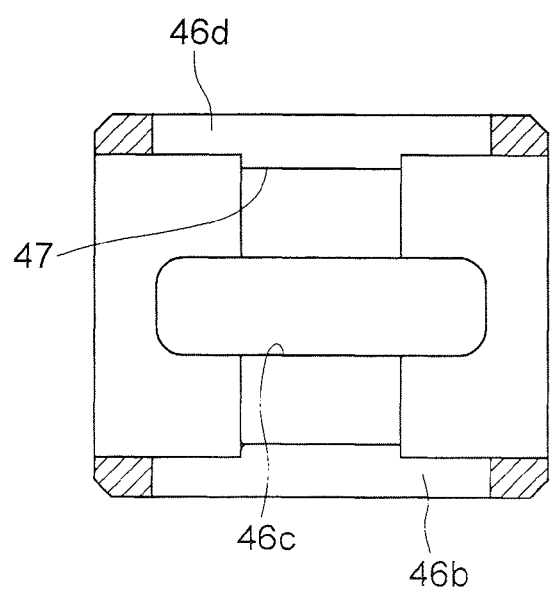

FIGS. 14A and 14B are views each depicting a modified example of the key lock collar of the steering apparatus according to the fourth embodiment of the present application. FIG. 14A is a side view, and FIG. 14B is a sectional view taken along the line 14B-14B in FIG. 14A. In the present modified example, four elongate holes 46a, 46b, 436c, 46d are provided at equal intervals in the circumferential direction. With this contrivance, the key lock bar engages with the key lock collar 35 at a far smaller steering angle. Thus, in the present invention including other embodiments, the number of elongate holes can be changed such as setting the number of elongate holes to "1" and "3" or more.

Note that the specific configurations have been demonstrated by way of the first through fourth embodiments in order to describe the present invention, however, the present invention is not limited to those configurations but can be modified and improved in a variety of forms in carrying out the present invention.

For example, the slip ring may be, without being limited to those described above, configured to differentiate the number, the shape, the arrangement, etc of the protruded portions.

Furthermore, the shape of the portion, in the face-to-face relationship with the slip ring, of the slip ring can be taken to change the number of the large-diameter portions, the number of the small-diameter portions, the widths in the axial direction thereof, the diametrical dimensions thereof, etc in a way that corresponds to the shape etc of the slip ring.

The slip torque can be also further stabilized by applying grease over the abutting portion between the key lock collar and the slip ring and the abutting portion between the slip ring and the steering shaft.

The portion of the key lock collar, into which the lock bar is inserted, may be configured to form a bottomed groove extending in the axial direction in the outer peripheral portion of the key lock collar in place of the elongate holes described above, and a plurality of grooves may also be formed in the circumferential direction. Alternatively, such a configuration may also be taken that a plurality of protruded portions protruding outwardly in the radial directions and extending in the axial direction may be arranged in the circumferential direction.

As discussed above, according to the steering apparatus of the present invention, it is feasible to provide the steering apparatus configured to further stabilize the slip torque of the key lock collar and to enlarge the range of the dimensional allowance.

What is claimed is:

1. A steering apparatus comprising:
a key lock collar being fitted on a steering shaft and restricted from rotating by a steering lock mechanism when performing a steering lock; and
a slip ring being interposed between the steering shaft and the key lock collar in radial directions,
wherein the slip ring includes a plurality of protruded portions protruding outwardly or inwardly in the radial directions and being provided in a circumferential direction, and
an inner peripheral portion of the key lock collar covering the slip ring is formed with large-diameter portions and small-diameter portions in the axial direction, thereby providing a space for the slip ring to get flexed.

2. The steering apparatus according to claim 1, wherein the steering shaft is formed with stepped portions to restrict the slip ring from moving in the axial direction in a face-to-face relationship with axis-directional end portions of the slip ring.

3. The steering apparatus according to claim 1, wherein the slip ring includes ring portions not being formed with the protruded portions on the same circumference, and
the small-diameter portion abuts on only any one of the protruded portion and the ring portion.

4. The steering apparatus according to claim 1, wherein the protruded portion extends in the axial direction and takes a circular arc shape in section cut vertically in the axial direction.

5. The steering apparatus according to claim 1, wherein the axis-directional portion of the key lock collar covering the slip ring is formed with two or more small-diameter portions.

6. The steering apparatus according to claim 1, wherein the small-diameter portion is provided in a position that faces a substantially lengthwise center of the slip ring in the axial direction.

7. The steering apparatus according to claim 1, wherein the large-diameter portion and the small-diameter portion are formed continuously by a smooth curved surface in the axial direction.

8. The steering apparatus according to claim 1, wherein the protruded portions protruding outwardly in the radial directions are disposed in two areas in the axial direction with the ring portions being interposed therebetween, which are not formed with the protruded portions on the same circumference, and
the two small-diameter portions are formed in the axial direction.

9. The steering apparatus according to claim 1, wherein the key lock collar includes a holed portion into which the steering lock mechanism inserts a rotation preventing bar, and
the holed portion is formed in a portion not facing the slip ring in radial directions.

10. The steering apparatus according to claim 1, wherein the protruded portions protrude outwardly in the radial directions, and
the small-diameter portions and the protruded portions are disposed in face-to-face positions in the radial directions.

* * * * *